Figure 1:
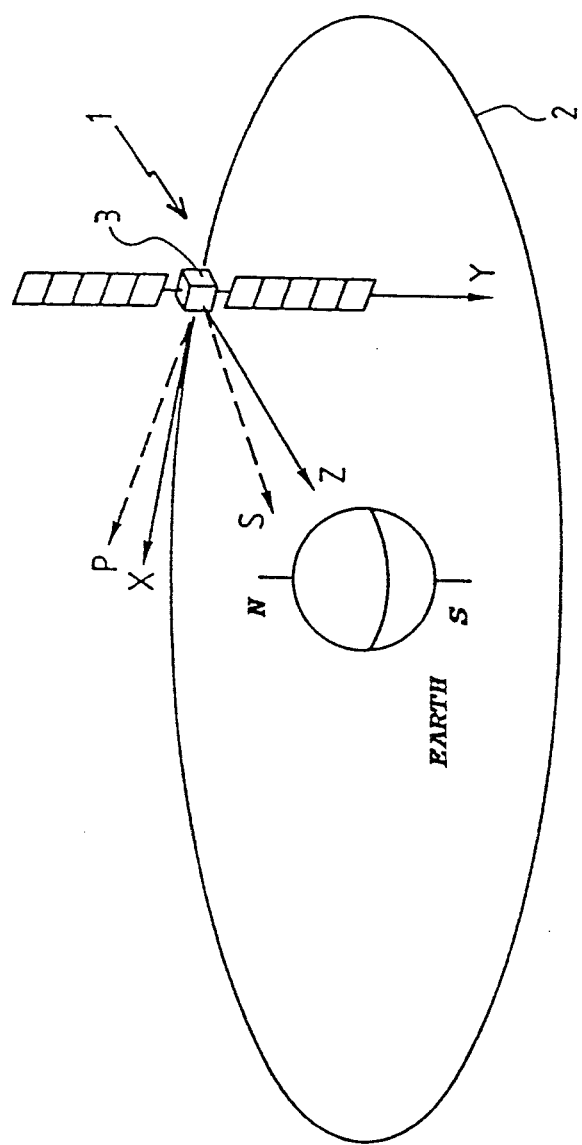
Figure 1:
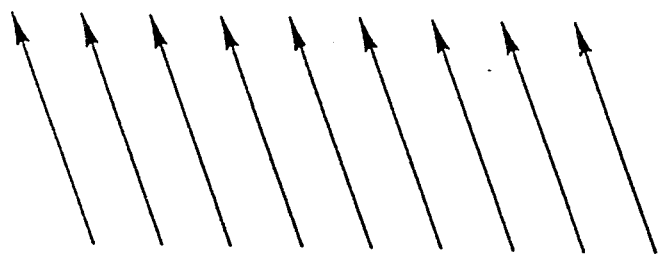
Figure 1:
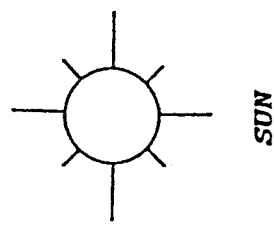

United States Patent

Flament

[11] Patent Number: 5,149,022
[45] Date of Patent: Sep. 22, 1992

[54] SATELLITE ROLL AND YAW ATTITUDE CONTROL METHOD

[75] Inventor: Patrick Flament, Le Cannet, France

[73] Assignee: Aerospatiale Societe Nationale Industrielle, Paris, France

[21] Appl. No.: 619,548

[22] Filed: Nov. 29, 1990

[30] Foreign Application Priority Data

Nov. 29, 1989 [FR] France ............... 89-15732

[51] Int. Cl.$^5$ .................................. B64G 1/36
[52] U.S. Cl. ........................... 244/168; 244/165; 244/164
[58] Field of Search ............ 244/164, 165, 168, 158 R

[56] References Cited

U.S. PATENT DOCUMENTS

| | | | |
|---|---|---|---|
| 4,230,294 | 10/1980 | Pistiner | 244/165 X |
| 4,260,942 | 4/1981 | Fleming | 244/165 |
| 4,325,124 | 8/1982 | Renner | 244/164 X |
| 4,732,354 | 3/1988 | Lievre | 244/168 X |
| 4,767,084 | 8/1988 | Chan et al. | 244/164 |
| 4,949,922 | 8/1990 | Rosen | 244/168 |

FOREIGN PATENT DOCUMENTS

| | | |
|---|---|---|
| 0101333 | 2/1984 | European Pat. Off. . |
| 0295978 | 12/1988 | European Pat. Off. . |
| 2522614 | 3/1982 | France . |
| 2531547 | 8/1982 | France . |

Primary Examiner—Jesûs D. Sotelo
Assistant Examiner—Christopher P. Ellis

[57] ABSTRACT

A method to control the attitude in roll (X) and in yaw (Z) of a satellite including two solar generator panels adapted to be oriented independently of each other about a pitch axis. In a preliminary stage: two geometrical axes x and z are selected in the plane of the roll and yaw axes, there being associated with the z axis a tolerable command torque error much lower than for the x axis, and a correlation law is established between satellite panel depointing angles $\gamma_N$ and $\gamma_S$ and possible command torques due to solar radiation pressure. Then cyclically while the satellite performs its orbit: a theoretical attitude correction torque in the plane of the roll and yaw axes is calculated, a possible torque is identified having on the z axis, a component substantially identical to that of the theoretical torque, and on the x axis, a component as close as possible to the theoretical torque component, and there are applied to the panels the depointing angles associated with the possible torque in accordance with the correlation law.

24 Claims, 10 Drawing Sheets

SATELLITE ROLL AND YAW ATTITUDE CONTROL METHOD

BACKGROUND OF THE INVENTION

The invention concerns roll and yaw attitude control of a satellite stabilised on three axes in an operational orbit.

In this context a satellite is any artificial object in the solar system:
- orbiting the Earth or any other planet in the solar system, or
- orbiting a satellite of any planet in the solar system, or
- in solar orbit, possibly a transfer orbit between two planets.

The attitude of an orbiting satellite is disturbed by various torques, the major causes of which are:
- the asymmetry of the solar radiation pressure due to the angle of the pitch axis (Y) of the satellite relative to the Sun (which angle is not equal to 90°), to the differing reflectivity of different parts of the satellite and to any geometrical asymmetry of the satellite,
- the terrestrial gravity gradient,
- the terrestrial magnetic field, and
- the aerodynamics of the environment (in low orbits).

Consequently, a system for controlling the attitude of a satellite in its orbit is essential. Four types of active system have previously been proposed.

Three of these active attitude control systems increase the mass of the satellite:
- the use of thrusters primarily intended for station-keeping: this widely used solution requires an additional mass of propellants for controlling the attitude of the satellite (typically 9 kg of propellants for a satellite life of seven years),
- the use of the terrestrial magnetic field interacting with magnetic dipoles created on board the satellite by current loops: this solution requires the provision of coils and in some instances ferromagnetic cores,
- the use of the solar radiation pressure acting on specific surfaces that can be deployed and/or oriented relative to the satellite body by actuators: this solution increases the mass of the satellite and reduces its reliability as a result of adding the orientable surfaces and their deployment and/or actuation mechanism.

Representative prior art includes:
patent FR-2.513.589: PROCEDE ET DISPOSITIF POUR ACTIONNER L'AXE DE ROULIS D'UN SATELLITE AVEC UNE DIRECTION DESIREE,
patent DE-2.537.577: LAGERREGELUNG FUR SATELLITEN,
patent FR-2.550.757: REGULATION DE POSITION DE SATELLITES,
patent U.S. Pat. No. 3,304,028: ATTITUDE CONTROL FOR SPACECRAFT,
patent FR-2.529.166: PROCEDE DE MAINTIEN EN POSITION D'UN SATELLITE PAR LA NAVIGATION A L'AIDE DE VOILE SOLAIRE ET VEHICULE SPATIAL METTANT EN OEUVRE LE PROCEDE,
patent FR-2.530.046: PROCEDE ET DISPOSITIF DE COMMANDE D'ATTITUDE POUR SATELLITE GEOSYNCHRONE.

The fourth type of active system, which is the only known system capable of controlling the attitude of a satellite stabilised on its three axes without incurring a mass penalty, entails orienting the surfaces of the solar panels relative to the Sun by using their drive motors, in order to create torques around two axes perpendicular to the pitch axis (Y) as a result of the effect of the solar radiation pressure. This technique uses equipment already provided on the satellite:
- the solar panels, used as the surfaces exposed to the solar radiation,
- the solar generator drive motors, used as actuators for these surfaces.

Representative prior art includes:
ATTITUDE CONTROL BY SOLAR SAILING—A PROMISING EXPERIMENT ON OTS 2—ESA JOURNAL 1979, Vol 3.
ONE YEAR OF SOLAR SAILING WITH OTS—ESA BULLETIN Aug. 31, 1982.
SYSTEME DE CONTROLE D'ATTITUDE D'UN SATELLITE GEOSTATIONNAIRE—Patent FR-2.531.547.
SYSTEM FOR CONTROLLING THE DIRECTION OF THE MOMENTUM VECTOR OF A GEOSYNCHRONOUS SATELLITE—U.S. Pat. No. 4,325,124.
also U.S. Pat. No. 3,945,148: SATELLITE ROTATION BY RADIATION PRESSURE, which proposes the use of the solar pressure on the solar panels, which are appropriately oriented to rotate the satellite in order to stabilise it.

In the following description the term "solar generator" refers to the combination of both solar panels, the term "solar panel" designating the systems that can be oriented by the drive motors, namely:
- the photovoltaic elements of the solar generator,
- the structure supporting these elements,
- the mechanisms associated with this structure which:
  hold it in the stowed position until the satellite reaches its orbital configuration,
  deploy it and maintain it in the deployed configuration,
- all the additional elements which, in the orbital configuration, are fixed to the structure and which have various roles, including (for example):
- heatshields which are used to limit heat loss from the satellite during phases in which the solar generator is not fully deployed,
- surfaces which improve the luminous flux impinging on the photovoltaic elements (shadow uniformisation screens, for example), and
- solar sails designed to modify the system's solar command torque capacity.

In some cases a satellite has deployable heat sinks which can also be used as surfaces exposed to the solar radiation.

The previously mentioned U.S. Pat. No. 4,325,124 discloses an application of this principle which uses data from the terrestrial sensor four times each day to determine the depointing of the satellite relative to S and P inertial axes (see FIG. 1). This data is then used in an open-loop control system to manoeuvre one of the solar panels, advancing or retarding it relative to its nominal displacement facing the Sun, in order to create torques adapted to return the satellite towards the desired attitude.

The previously mentioned patent FR-2.531.547 discloses another application of this principle which uses data from the terrestrial sensor twice each day to determine the depointing of the satellite relative to the S and P inertial axes. This data is then used in an open-loop control system to modify the orientation of the solar panels to compensate inertial torques disturbing the satellite.

The major disadvantages of these control systems which impose no mass penalty are as follows:

the control system is designed to control the satellite relative to an inertial frame of reference which makes it incapable of fine control of a satellite subject to disturbing torques in a satellite-oriented frame of reference and/or representing a second harmonic of the orbital period; also, this control system necessarily has the same pointing performance relative to the roll axis (X) and the yaw axis (Z); this improves the pointing performance in yaw (which is generally not necessary) to the detriment of the pointing performance in roll (which is generally much more necessary);

the attitude is measured only once each day, which gives a very long attitude control response time and considerably restricts the control mode capture field and renders it sensitive to nutation phenomena;

the control system does not take account of the significant correlation between the torques generated about the two axes, making some combinations of torque impossible; this limits the control system to compensating only certain favourable combinations of inertial torques;

it is impossible to benefit from attitude control concepts other than that based on the kinetic moment fixed with respect to the pitch axis (Y) or from the capabilities of other actuators on board the satellite.

SUMMARY OF THE INVENTION

An object of the invention is to remedy the aforementioned disadvantages, with no mass penalty, by applying to the satellite a closed-loop control law that can be defined relative to a satellite-oriented frame of reference and enables the attitude of the satellite to be controlled continuously with respect to its geometrical axes in such a way as to enable control:

with independent accuracies of pointing in roll and in yaw, which can be selected separately;

with a capture field compatible with the amplitude of the disturbing torques;

which is relatively insensitive to any nutation phenomena;

which makes it possible to compensate for torques disturbing the satellite irrespective of their origin and how they vary with time (constant, inertial, higher harmonics relative to the orbital period);

which allows for any possibility of orienting the kinetic moment of the satellite and its other actuators.

To this end the invention proposes a method of controlling the attitude in roll (X) and in yaw (Z) of an artificial satellite stabilised in pitch (Y) on its orbit in the solar system and comprising a satellite body carrying on its North and South sides two solar generator panels normally approximatively facing the Sun, adapted to be oriented independently of each other about a North-South pitch axis by drive motors adapted to be commanded separately and comprising an attitude measurement system adapted to provide at least a measurement of the attitude in roll or in yaw, this method comprising the following steps:

as a preliminary stage:

two geometrical axes x and z of the satellite are chosen in the plane of the roll and yaw axes, there being associated with the z axis a maximum value of tolerable command torque error which is much lower than the maximal value of tolerable command torque error on the x axis, and a law of correlation is established between pairs of possible values of depointing angles $\gamma_N$ and $\gamma_S$ of the panels respectively carried by the North and South sides of the satellite body relative to a nominal configuration of said panels in which said panels face towards the Sun and possible command torques resulting therefrom in the plane of the roll and yaw axes due to solar radiation pressure, and the locus of said possible torques is determined;

then, cyclically at a specific frequency that is constant or not as the satellite pursues its orbit:

instantaneous measurement signals from the attitude measurement system are used to calculate a theoretical command torque in the plane of the roll and yaw axes needed to cancel any instantaneous attitude error of the satellite in the plane of the roll and yaw axes, possible control torques are looked for on said locus having, relative to the z axis at the time in question, a component substantially identical to that of the theoretical command torque and, relative to the x axis at the same time in question, a component as close as possible to the component of the theoretical command torque, and said correlation law is used to deduce the associated pair of possible depointing angles, and the drive motors (6) are commanded to set the solar generator panels to said pair of depointing angle values.

The present invention can be adapted to all satellite attitude control concepts and enables a substantial mass saving in all cases. For example:

1. satellite with low or no kinetic moment and any orientation (in short null or no kinetic moment) provided with three reaction wheels, one on each axis; in this case, the mass saving secured by the invention relates to:

the propellant for desaturating the reaction wheels on the roll and yaw axes, as these are desaturated by the solar control function, the size of the roll-yaw reaction wheels, as the maximum kinetic moment is divided by five or ten as it can be desaturated twice each day instead of each week or each month;

2. satellite with fixed kinetic moment on the pitch axis (Y); in this case the mass saving secured by the invention relates to the roll-yaw control propellants, as this control is no longer provided by thrusters, unless the solar control function leads to a loss of electrical power from the solar generator which is not compensated for by the power margins; depending on the satellite, this occurs for periods accounting for up to 10% of the satellite's life;

3. satellite with kinetic moment on the pitch axis (Y), the kinetic moment being orientable in one direction using any of the following devices, for example:

a reaction wheel oriented according to the degree of freedom of the kinetic moment, two kinetic wheels in a V arrangement with the resultant oriented on the Y axis, the difference in their speed being used to displace the kinetic moment, an orientable kinetic wheel whose axis is mounted on a pivot;

in this case, the mass saving secured by the invention relates to:

the propellant for desaturation (unloading) of the component in the roll-yaw plane of the kinetic moment, as this component is desaturated by the solar control function, the propellants used for control in the direction perpendicular to the kinetic moment, as this control is no longer provided by thrusters;

4. satellite with kinetic moment along the pitch axis (Y), the kinetic moment being orientable in two directions using either of the following devices, for example:

two reaction wheels each oriented according to a respective degree of freedom of the kinetic moment, or an orientable kinetic wheel whose axis is mounted on a double pivot or a universal joint;

in this case, the mass saving secured by the invention relates to the propellants for desaturating the component in the roll-yaw plane of the kinetic moment as the latter is desaturated by the solar control function;

5. satellite provided with continuous actuators (for example: magnetocouplers or electrical propulsion in addition to kinetic wheels or reaction wheels as mentioned previously); in this case the saving secured by the invention relates to:

the number of continuous actuators, which can be reduced to a single axis (saving mass), the reduced torque capacity of the continuous actuators (saving mass), reduced use of the continuous actuators, (saving electrical power), improved pointing accuracy.

In all the cases mentioned above, the kinetic moment can be generated either by a wheel whose only function is to generate kinetic moment or by a rotating part which has some other function on the satellite. In the following description the term "wheel" refers to either of these cases.

In more precise terms, the invention proposes the following preferred features:

the satellite includes actuators which are commanded to generate compensation torques defined by the difference between the theoretical command torque and the possible command torque about at least the axis chosen for the correlation;

the satellite comprises a system for generating kinetic moment with fixed components in the plane of the roll and yaw axes and the x and z axes are respectively coincident with the roll and yaw axes;

the kinetic moment generator system comprises a kinetic wheel with its axis parallel to the North-South pitch axis;

the satellite comprises a system for generating an orientable kinetic moment, possibly with a null value, with a component variable with respect to at least one axis in the plane of the roll and yaw axes, the x axis is coincident this said axis, and:

if the theoretical and possible command torques are different, there is applied to said kinetic moment generator system a command signal adapted to vary said variable component in such a way as to generate an additional torque equal to the difference between the theoretical and possible command torques, if the theoretical and possible command torques are equal, there is calculated the value of a desaturation torque adapted to vary said variable component of the kinetic moment until it equals a predetermined nominal value, a global theoretical command torque is calculated equal to the sum of the theoretical command torque and the desaturation torque, possible torques are looked for on said locus, a second possible command torque having a component about the z axis substantially equal to that of the theoretical command torque and a component about the x axis as close as possible to that of the global theoretical command torque, the correlation law is used to deduce therefrom a second pair of possible values of depointing angles subsequently imposed on the solar generator panels, and there is imposed on the kinetic moment generator system a variation of said variable components adapted to generate a compensation torque equal but opposite to the difference between the second possible command torque and the theoretical command torque, said two stages being realizable in parallel;

said kinetic moment generator system comprises a reaction wheel on the variable component axis or whose axis is contained in the plane defined by the pitch axis and the variable component axis;

said system further comprises a kinetic wheel substantially on the pitch axis;

said reaction wheel is on the yaw axis, the x axis is parallel to said yaw axis and the z axis is parallel to the roll axis;

said kinetic moment generator system is adapted to generate a kinetic moment with a plurality of component on different axes in the plane of the pitch and yaw axes and the x and z axes are defined at all times so as to minimise the difference between said variable components and a respective associated predetermined value;

said kinetic moment generator system comprises a plurality of reaction wheels whose axes are respectively in the planes defined by the pitch axis and one of the kinetic moment variable component axes;

said kinetic moment generator system comprises a wheel whose rotation axis has a plurality of degrees of freedom in rotation with axes perpendicular to the variable component axes;

the axis of the wheel is nominally on the satellite pitch axis;

the wheel has two degrees of freedom about the satellite roll and yaw axes;

said kinetic moment generator system is adapted to generate a kinetic moment with two variable components about different axes in the plane of the roll and yaw axes, the x and z axes are coincident with said two variable component axes and interchangeable and the z axis is at all times coincident with that of the two axes corresponding to that of the two variable components which is further from a predetermined nominal value associated with said axis;

said kinetic moment generator system comprises two reaction wheels respectively on the roll and yaw axes;

said system further comprises a reaction wheel or a kinetic wheel substantially on the pitch axis;

the kinetic moment generator system comprises two kinetic wheels disposed in a V arrangement with their axes in the plane defined by the pitch axis and the variable component axis and in a substantially symmetrical relationship thereto on the opposite side of the pitch axis, respectively;

the variable component axis is on the yaw axis, the x axis is parallel to said yaw axis and the z axis is parallel to the roll axis;

the kinetic moment generator system comprises a kinetic wheel whose axis has one degree of freedom in rotation with an axis perpendicular to the variable component axis;

the axis of the wheel is nominally on the satellite pitch axis;

the variable component axis is on the yaw axis, the x axis is parallel to the yaw axis, the z axis is parallel to the roll axis and the pivot axis is on the roll axis;

the cycle period is between 0.5 second and 1 000 seconds approximately.

Figure 3:
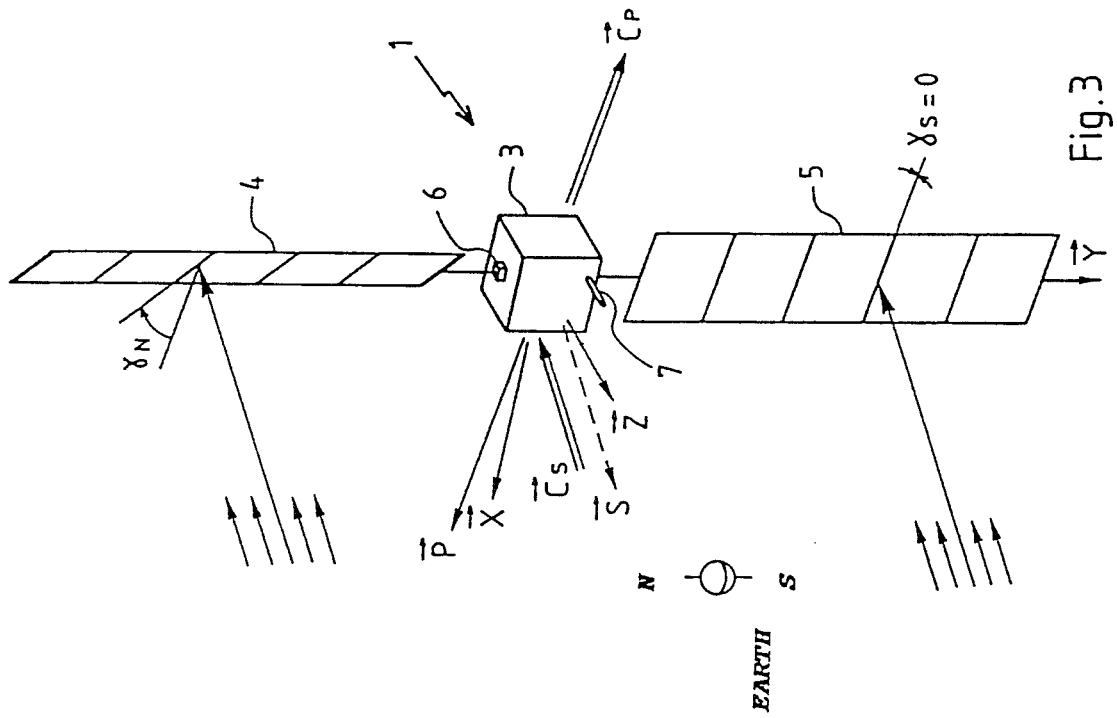
Figure 2:
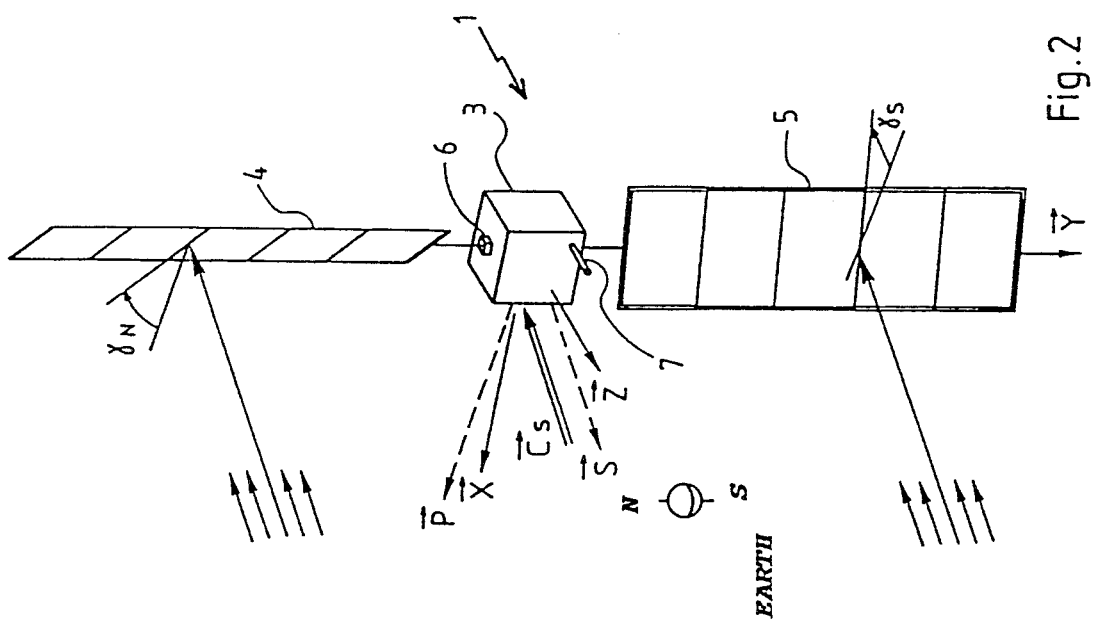
Figure 4:
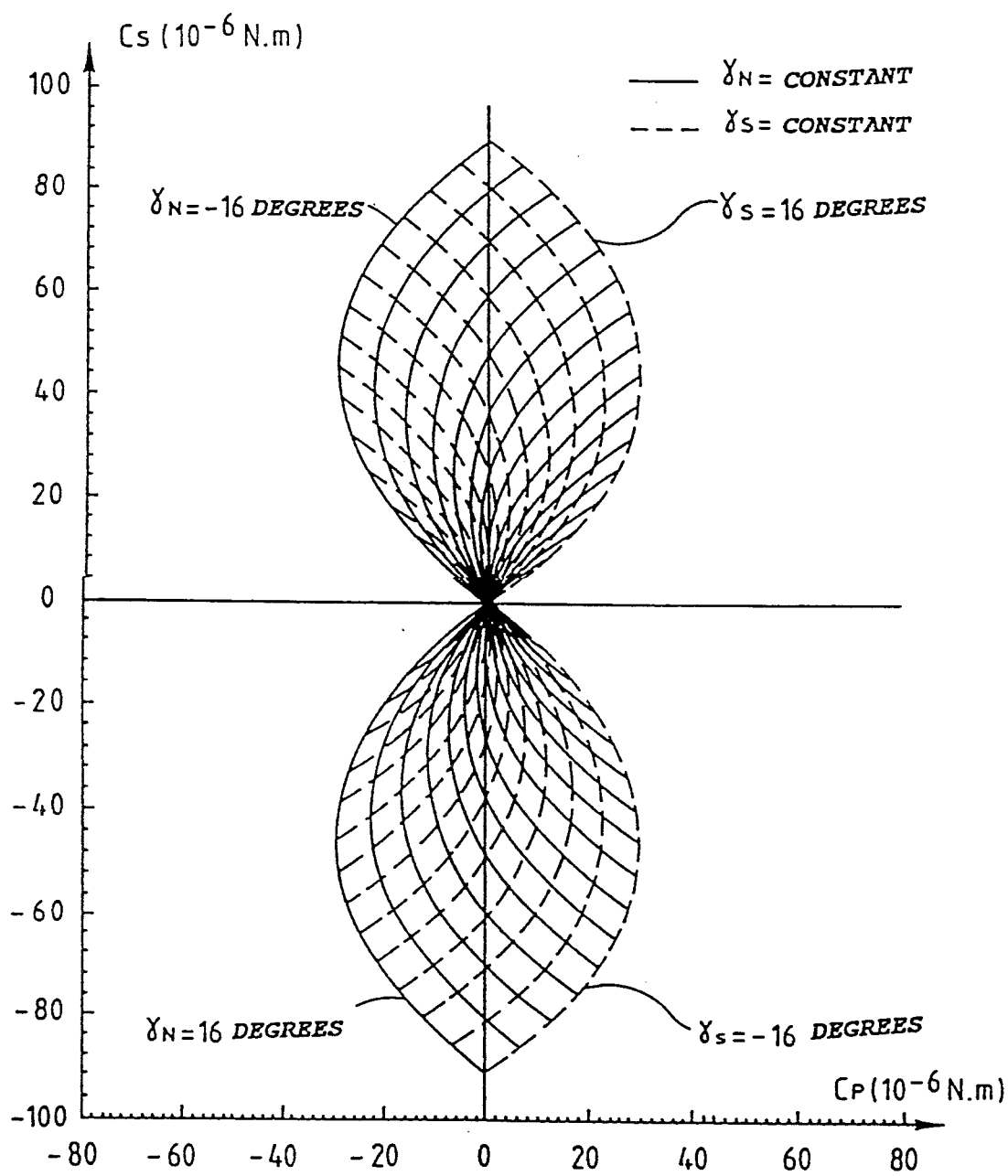
Figure 5:
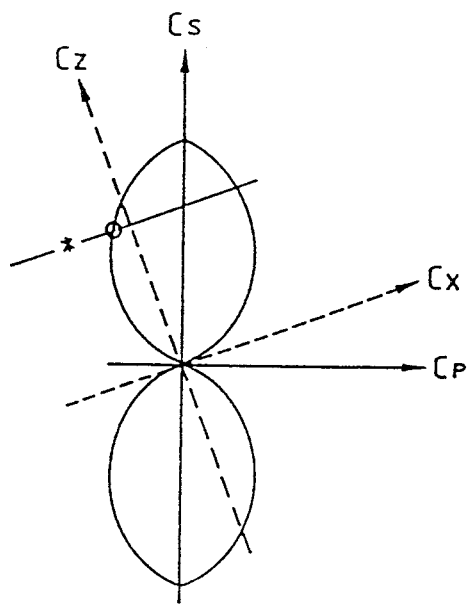
Figure 6:
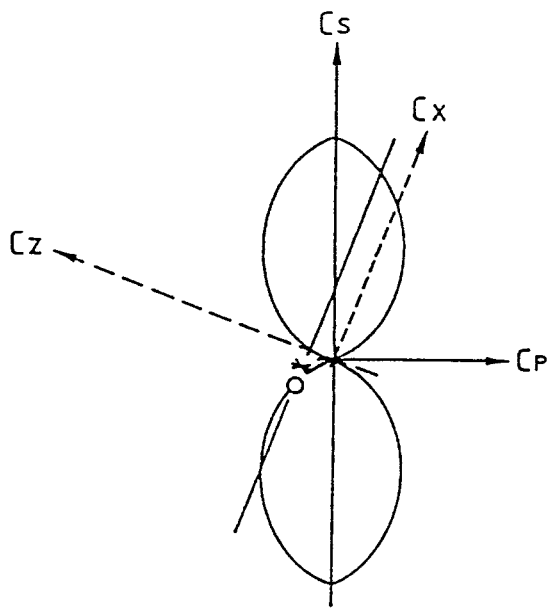
Figure 7:
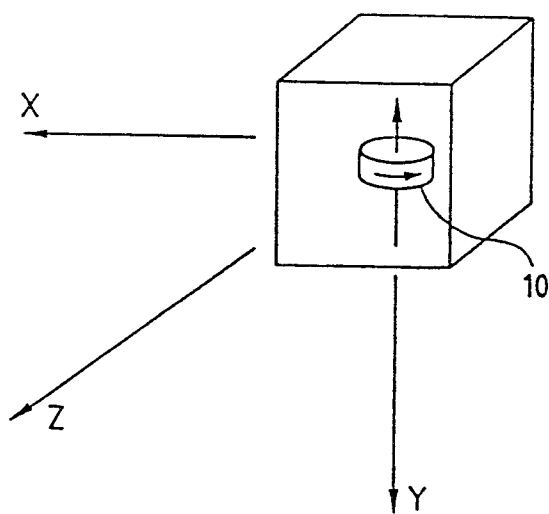
Figure 8:
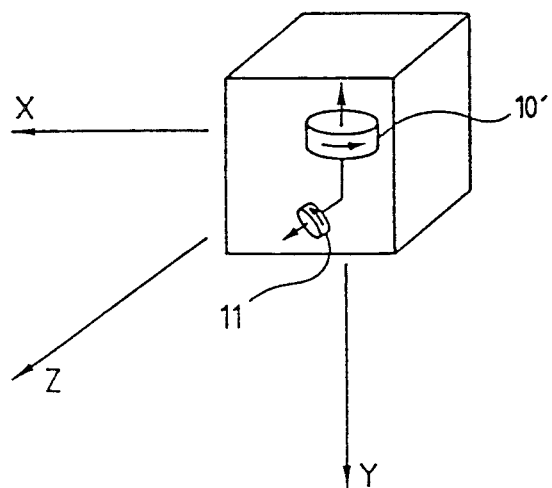
Figure 9:
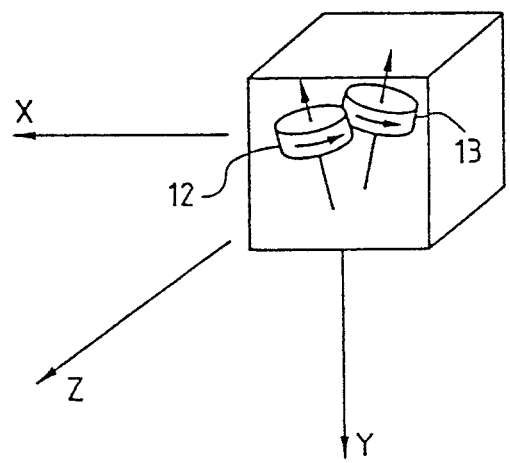
Figure 10:
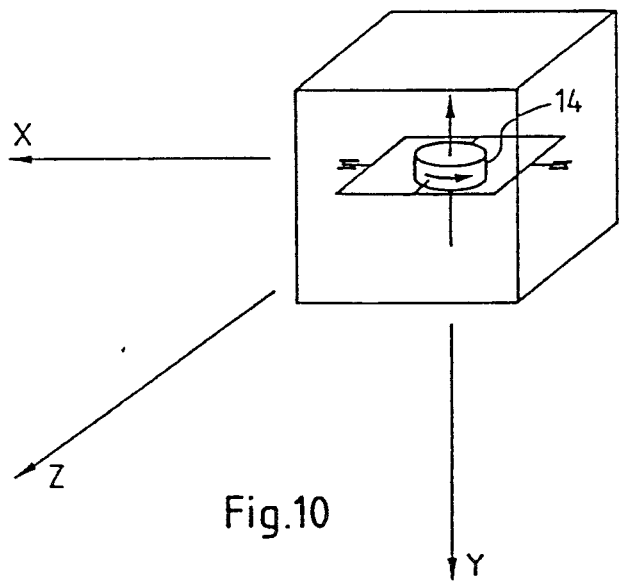
Figure 11:
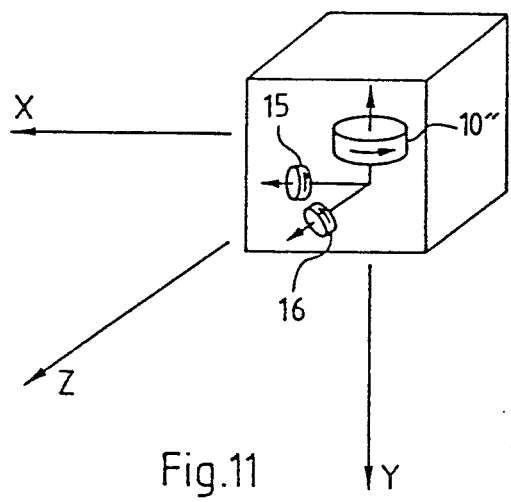
Figure 12:
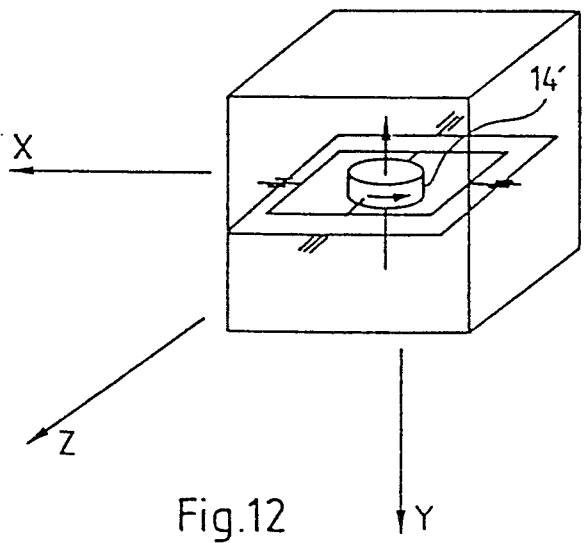
Figure 13:
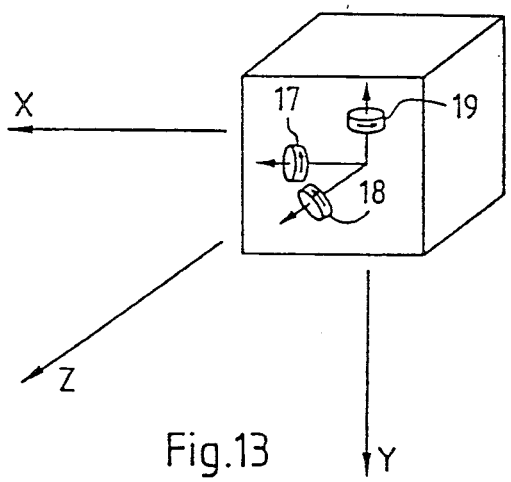
Figure 14:
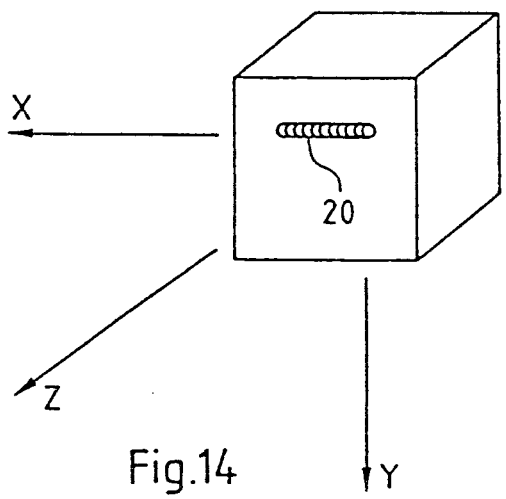

Objects, characteristics and advantages of the invention will emerge from the following description given by way of non-limiting example only and with reference to the appended diagrammatic drawings in which:

FIG. 1 is a schematic view of a spacecraft stabilised on three axes in orbit around the Earth, FIG. 2 is a schematic perspective view of this satellite in a configuration in which the solar pressure generates a windmill torque, FIG. 3 is another schematic perspective view of this satellite in a configuration in which the solar pressure generates an unbalance torque and an associated windmill torque, FIG. 4 is a graph showing the torque that can be produced by the solar radiation pressure, FIGS. 5 and 6 are two examples of how to use the FIG. 4 graph to determine torques to be applied in actuality from the required torques, FIG. 7 shows a fixed kinetic moment wheel configuration, FIGS. 8 through 10 show single-axis orientable kinetic moment wheel configurations, FIGS. 11 and 12 show two-axis orientable kinetic moment wheel configurations, FIG. 13 shows a low kinetic moment wheel configuration with any orientation, FIG. 14 shows a satellite equipped with a magnetic actuator, FIGS. 15 through 18 are block diagrams of roll and yaw attitude control systems respectively associated with FIGS. 7, 8 through 10, 11 through 13 and 14.

FIG. 1 shows a satellite in a circular Earth orbit 2.

The satellite has a central body 3. Three axes define a direct frame of reference fixed relative to the satellite:

an axis X tangential to the orbit 2 and in the same direction as the orbital speed: this axis is conventionally called the roll axis;

an axis Y perpendicular to the plane of the orbit 2 and oriented in the terrestrial North-South direction: this axis is conventionally called the pitch axis; and an axis Z perpendicular to the axes X and Y and oriented towards the Earth: this axis is conventionally called the yaw axis.

In some satellites this roll-pitch-yaw axis system may be oriented differently relative to the orbit and/or the Earth, depending on specific mission requirements. The invention is equally applicable in these cases, even if the orientation of the satellite varies during the mission.

The satellite includes an attitude control system (see below) which stabilises it in the orbit 2 with respect to these three axes.

It further includes (see also FIGS. 2 and 3) a solar generator comprising two panels 4 and 5 respectively extending to the North and to the South. They can be oriented relative to the body 3 by rotation about the Y axis by two separately controllable drive motors of any appropriate known type, one of which, on the North side of the body 3, is denoted by the reference number 6: these motors are normally adapted to hold the panels facing substantially towards the Sun, perpendicular to its rays.

In practice the satellite further comprises various appendages (antennas, etc) which are fixed or effectively fixed and whose exposure to the solar radiation pressure produces disturbing torques about the X and Z axes which are added to those resulting from any intentional or unintentional asymmetry of the solar generator.

An axis S in the X-Z orbital plane is the projection in this plane of a vector oriented from the satellite to the Sun. An axis P in the X-Z orbital plane and perpendicular to the axis S defines with the Y and S axes a direct frame of reference (P, Y, S).

Note that the satelite-based frame of reference (X, Y, Z) rotates relative to the inertial frame of reference (P, Y, S) about the Y axis at the rate of one revolution per orbit (one revolution per day in the case of a geostationary orbit).

The satellite further includes a set of sensors adapted to measure the attitude of the satellite, usually at least one terrestrial sensor 7 (an infrared sensor, for example) adapted to measure the attitude in roll and in pitch and sun or star detectors for measuring in particular the attitude in yaw, if required.

The remaining description is concerned only with controlling the attitude of the satellite about the roll and yaw axes, pitch attitude control being achieved by any appropriate known means (not shown), for example by variation of the kinetic moment. The satellite may also include a nutation damping device which will not be described in more detail as it does not form part of the invention.

The invention exploits the fact that the solar radiation pressure (solar pressure, for short) can, depending on the orientation of the two solar panels, generate two types of torque in the orbital plane, respectively about the S and P axes (in the remainder of the description the depointing of the North panel and the depointing of the South panel relative to their nominal orientation facing the Sun are respectively denoted $\gamma_N$ and $\gamma_S$):

if the depointing angles of the panels 4 and 5 are equal and opposite (as in FIG. 2) the solar radiation pressure induces a "windmill" torque $C_S$ parallel to the S axis;

if depointing is imposed on one panel (here the panel 4) while the other panel retains its nominal orientation (as in FIG. 3), the solar radiation pressure induces an "unbalance" torque $C_P$ parallel to the P axis, accompanied by an unwanted torque $C'_S$ parallel to the S axis.

It is possible to obtain a great variety of torques ($C_S$, $C_P$) by combining these two types of depointing, and the locus of these torques can be represented by the parametered surfaces shown in the FIG. 4 graph, with two lobes symmetrical relative to each of the two coordinate axes and bordered by lines representing the maximum authorised depointing angles.

FIG. 4, which is a parametered representation of the solar torque capacity (that is, the torque that it is possible to obtain using the solar radiation pressure) represents a EUTELSAT 2 type satellite, for example, for which depointing by up to 16° on either side of the nominal position of the panels is authorised.

Depending on the satellite, the maximum authorised depointing varies between 3° and 20° in practice; this results in great differences between the torques that can be achieved, but in all cases this makes it possible to exploit the solar radiation pressure to control attitude in roll and in yaw. It must be remembered that the maximum authorised depointing depends on the maximum loss of electrical power from the solar generator that can be tolerated.

The shape of the FIG. 4 graph naturally varies with the geometry and the structure of the solar panels (any asymmetry of these panels, for example, etc).

FIGS. 5 and 6 are graphs similar to FIG. 4 on which two coordinate frames of reference ($C_X$, $C_Z$) have the same origin as the coordinate frame of reference ($C_P$, $C_S$) but are offset angularly. $C_P$ and $C_S$ define the components of a given torque along the P and S axes, and $C_X$ and $C_Z$ define the components of this torque along two axes x and z perpendicular to the orbital plane and having relative to P and S the same angular offset as the offset between the coordinate frames of reference.

The x and z axes are preferably (but not necessarily) fixed relative to the satellite body and are such that:

on the x axis a command torque error can be tolerated for either of the following reasons:

the error on the component $C_X$ of the torque results in an acceptable attitude error relative to the satellite specification, the error on the $C_X$ component of the torque can be compensated, for example by a torque produced by a kinetic moment orientation or actuator (magnetic or ionic) device of the satellite;

on the z axis a command torque error, for example, cannot be tolerated for any one or more of the following reasons:

the error in the component $C_Z$ of the torque results in an unacceptable attitude error relative to the specifications, the error in the component $C_Z$ of the torque cannot be compensated, for example by a torque produced by a device for orienting the kinetic moment of the satellite (for example, because this component of the kinetic moment does not exist or is saturated), there is no actuator device (or no available actuator device) for this axis.

A knowledge of the x and z axes, which are in practice parallel to the X and Z (or Z and X) axes, enables an optimum choice of a correction torque to be applied to the satellite by appropriate orientation of the solar panels based on the theoretical torque needed to correct the attitude of the satellite in roll and in yaw: this entails looking for a point on the locus or on the set of torques that can be obtained (double lobe of the $C_P$, $C_S$ graph) which has the same $C_Z$ component as the theoretical torque (identified by an asterisk in FIGS. 5 and 6) and whose $C_X$ component is closest to that of the theoretical torque.

The orientation of the x and z axes relative to the X and Z axes may be different or even variable in time.

Two situations can arise:

if it is possible to apply the exact component $C_X$ of the theoretical torque about the x axis the solar torques will enable:

complete control of the attitude of the satellite in roll and in yaw, and possibly approximation of the nominal value of the roll-yaw component(s) of any orientable kinetic moment provided on the satellite, or cancellation of the speed of the reaction wheel(s) in the roll-yaw plane if the satellite incorporates any, if it is not possible to apply the exact component $C_X$ of the theoretical torque about the x axis, the possible value of $C_X$ nearest the theoretical value is determined, the discrepancy being compensated by orientation of the kinetic moment or tolerated as an attitude error or compensated by another actuator device.

The difference between theoretical and actual solar torques can be significantly reduced by allowing a small, controlled error margin in respect of the torque $C_Z$ about the z axis which has no effect on the accuracy of control.

When the components of torque to be applied about the x and z axes have been chosen, the FIG. 4 graph, which represents the correlation between possible torques and depointing angles, is used to determine (possibly by means of an algorithm):

the solar panel depointing angles $\gamma_S$ and $\gamma_N$ which are appropriate to the creation of these torque components (corresponding command instructions are then sent to the solar generator panel drive motors), any components of variation of kinetic moment to be applied to reaction wheels, any components to be generated by the actuators.

It must be pointed out that:

if the torque about the axis exceeds the capacity of the system the maximum possible torque is used, the control logic described above can be improved by estimating the inertial torques and the yaw angle using a LUENBERGER type estimator, for example (as described in the articles mentioned later), the logic can be implemented on board the satellite, or on the ground, or both. This makes it possible to apply the present invention retrospectively to satellites which were not designed to use it, even after launch.

If there are reaction wheels, their desaturation law determines the torque needed to cancel the speed of these wheels or the roll-yaw component of the kinetic moment, which is in the same order of magnitude as the solar torques that can be achieved. This law may be a PI (proportional-integral) type law, for example:

$$C = -K.M. - Ki. \int M dt$$

where

M is the roll-yaw component of the kinetic moment of the satellite, $\int M dt$ is the time integral of M, C is the torque that the solar control function is required to apply to the wheel(s), K and Ki are coefficients chosen according to the characteristics of the satellite (in particular its solar torque capability) and performance requirements.

At least some of this desaturation occurs as soon as the solar torque needed for roll-yaw attitude control is within the lobes of the FIG. 4 graph.

The wheel is conventionally equipped with a compensator enabling the torque C required of the wheel to be converted into an achieved kinetic moment.

FIGS. 7 through 13 show seven possible embodiments of the arrangement of the kinetic and/or reaction wheels available for roll and yaw control of the satellite 1, and FIG. 14 shows another type of actuator:

FIG. 7 represents a design with a fixed kinetic moment parallel to the pitch axis attained by means of a kinetic wheel 10 parallel to the pitch axis, FIG. 8 represents a design with a kinetic moment orientable about one axis provided by a kinetic wheel 10' parallel to the pitch axis and a reaction wheel 11 rotating about an axis in the orbital plane, for example the Z axis, FIG. 9 represents a design with a kinetic moment orientable about one axis provided by two kinetic wheels 12 and 13 to either side of the pitch axis in the plane in which the kinetic moment can be oriented, for example the Y-Z plane, FIG. 10 represents a design with a kinetic moment orientable relative to one axis provided by a kinetic wheel 14 mounted on a single pivot; the wheel 14 is nominally parallel to the pitch axis; the pivot can orient it in a plane containing the pitch axis, for example the Y-Z plane, FIG. 11 represents a design with a kinetic moment orientable about a number of axes provided by a kinetic wheel 10' parallel to the pitch axis and a plurality of reaction wheels creating reaction torques in any direction in the roll-yaw plane, in this example two reaction wheels 15 and 16 respectively on the X and Z axes, FIG. 12 represents a design with a kinetic moment orientable about multiple axes provided by a kinetic wheel 14' mounted on multiple pivots; the wheel 14' is nominally parallel to the pitch axis; the pivot can orient it in any direction near the pitch axis; two pivots are shown in this example, FIG. 14 represents a design having a low kinetic moment with any orientation, using a plurality of reaction wheels for creating reaction torques in any direction in the roll-yaw plane, in this example two wheels 17 and 18 are respectively on the X and Z axes (a third reaction wheel 19 is also shown in this example); the satellite attitude sensor usually provides measurements on the three axes (not necessarily simultaneously), the terrestrial sensor being complemented, for example, by a star sensor aimed at the Pole Star, FIG. 14 represents a satellite equipped with one or more continuous actuators capable of delivering command torques in the roll-yaw plane; in this example a coil 20 oriented along the X axis produces a magnetic dipole on the X axis which, by interacting with the terrestrial dipole oriented approximately along the Y axis, applies to the satellite a torque about the Z axis.

FIGS. 15 through 18 show the control logic associated with FIGS. 7 through 14; in these figures:

the reference number 20 (20', 20" or 20''') denotes a calculation area that is in the onboard computer or is shared between the onboard computer and a ground computer or is entirely in the latter, the reference number 21 (21', 21" or 21''') denotes within the area 20 a unit in which are stored control laws appropriate to calculating theoretical torques $C_{xc}$ and $C_{zc}$ from the roll angle $\alpha r$ and/or yaw angle $\alpha l$, the reference number 22 (22', 22" or 22''') denotes a unit in which is stored a calculation algorithm implementing the graph of FIGS. 4, 5 and 6 and which, from the known x and z axes (supplied to it by the sensors 5, for example), determines the possible torque components $C_{xp}$ and $C_{zp}$, the reference number 23 (23', 23" or 23''') denotes a unit containing a model of the solar command torques and adapted to produce from these possible components command instructions for the drive motors 6, the reference number 24' (or 24"$_x$ and 24"$_z$) denotes a unit including a wheel desaturation program adapted to determine from the rotation speed of the wheel in question the torque that would have to be applied to the satellite to desaturate the wheel, the reference number 25 (or 25"$_x$ and 25"$_z$) denotes a unit containing a program adapted to determine the kinetic moment that the wheel would have to generate in order to obtain a torque to be applied in addition to the solar torque to obtain the theoretical torques, the reference number 25''' denotes a continuous actuator control unit, the reference number 26' (or 26"$_x$ and 26"$_z$) denotes the control loop of the corresponding wheel, the reference number 27' (or 27"$_x$ and 27"$_z$) denotes a tachometer associated with the wheel in question, and the dashed lines denote cause-and-effect relationships between the dashed outline boxes which denote physical phenomena.

Figure 15:
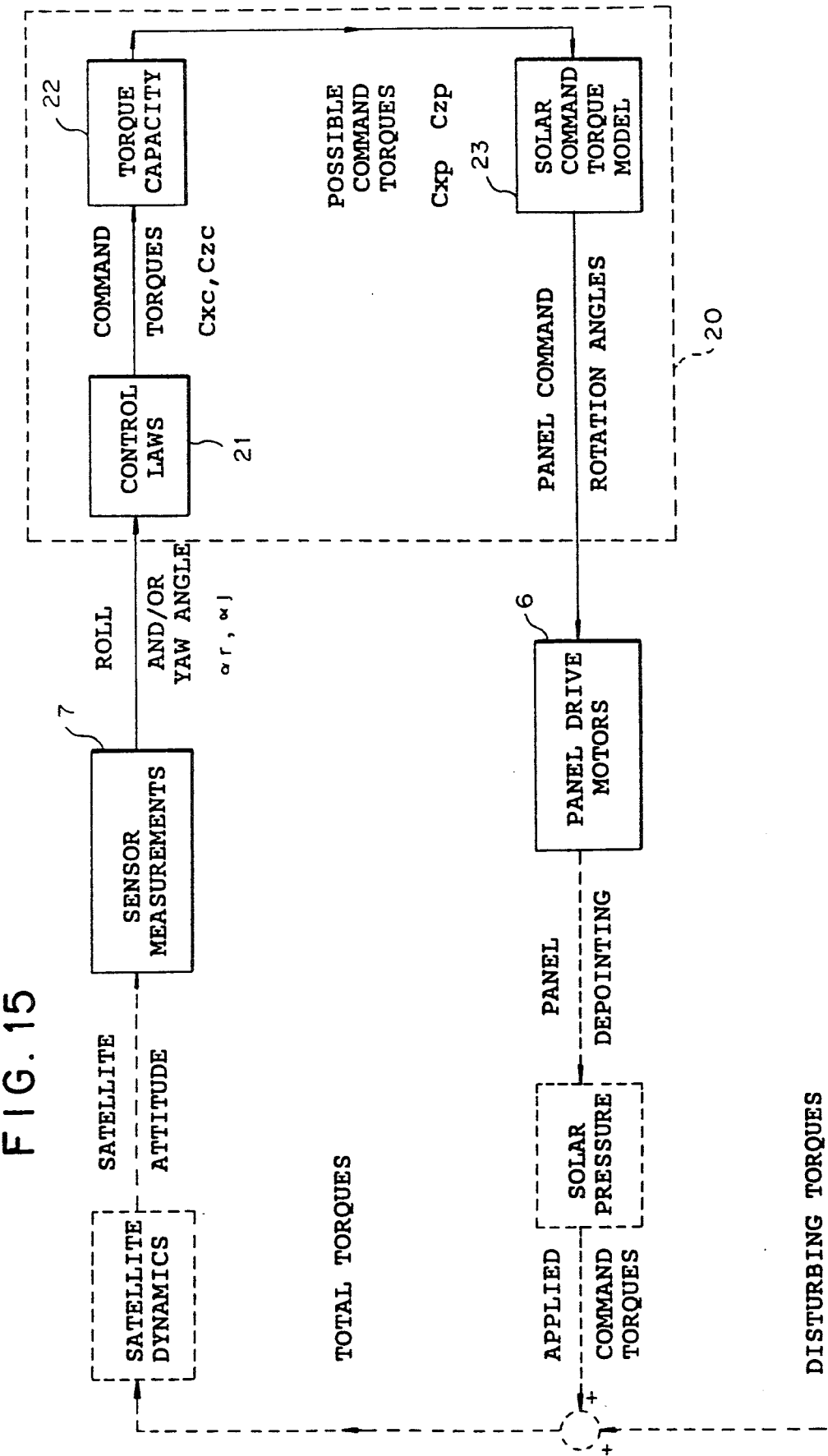

FIG. 15 summarises the control logic for the fixed kinetic moment attitude control situation.

The roll attitude measured by the terrestrial sensor 5 of the satellite is processed by a control law 21 to determine the torques to be applied in the roll-yaw plane to control the attitude of the satellite. In this example, use may be made of a "WHECON" type law such as that described in the document MAGNETIC DESATURATION OF A MOMENTUM BIAS SYSTEM—K. L. LEBSOCK—Journal of guidance and control, Vol. 6, no 6 Nov. 83.

The command torque in the roll-yaw plane and the torque capacity shown in FIG. 4 are converted into the (x, z) system of axes in which x is the roll axis and z is the yaw axis. The required performance in terms of roll pointing is achieved by applying the torque correctly about the z axis.

There are two situations to consider:

if it is possible to apply the command torque about the x axis, the attitude of the satellite will be accurate in roll and in yaw, if it is not possible to apply the command torque about the x axis, the computer determines the possible value nearest the command value, resulting in drift in the satellite attitude in yaw. The drift is inversely proportional to the depointing angle of the panels. It is therefore necessary to arrive at a compromise between accuracy of pointing in yaw and loss of electrical power from the solar generator due to the depointing of the panels.

Significantly improved accuracy of pointing in yaw is achieved by adding x axis torque error to the next x axis command torque, enabling rapid re-acquisition of good accuracy in yaw when control relative to the x axis is again possible.

Figure 16:
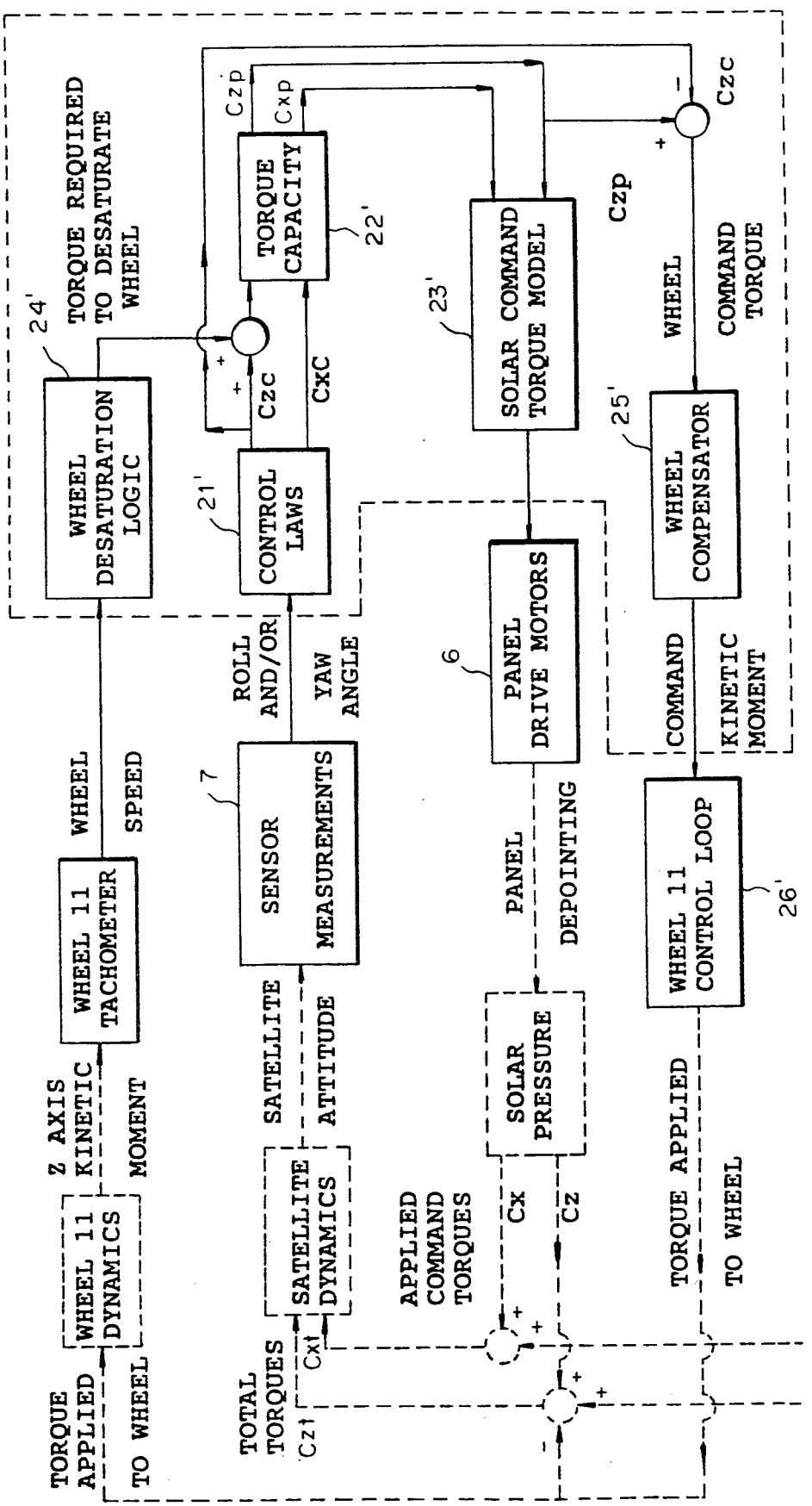

FIG. 16 summarises the attitude control logic in the case of a kinetic moment orientable about one axis.

The attitude measured by the satellite sensors is processed by a control law which determines the torques to be applied in the roll-yaw plane to control the attitude of the satellite (in this example use may be made of a "WHECON" type law such as that described in the document MAGNETIC DESATURATION OF A MOMENTUM BIAS SYSTEM— K. L. LEBSOCK—Journal of guidance and control, Vol. 6, no 6 Nov. 83). The torque needed to reduce the Z axis command torque (roll-yaw component of the kinetic moment) to zero is added to this component.

The command torque in the roll-yaw plane and the torque capacity shown in FIG. 4 are converted into a system of axes (x, z) in which x is the axis of the roll-yaw component of the kinetic moment and z is the perpendicular axis. An error in the torque about the x axis can be compensated by variation of the roll-yaw component of the kinetic moment.

Two situations can arise:

if it is possible to apply the command torque about the x axis the solar torques will enable attitude control of the satellite and approximation of the nominal (null or non-null) value of the component of the kinetic moment in the roll-yaw plane, if it is not possible to apply the command torque about the x axis, the computer determines the possible value nearest the command value; the discrepancy is compensated by kinetic moment actuators.

The integral of the difference between the command and achieved solar torques is inversely proportional to the authorised depointing of the panels. It is therefore again necessary to arrive at a compromise between the maximum value of the kinetic moment and the loss of electrical power from the solar generator due to depointing of the panels.

Figure 17:
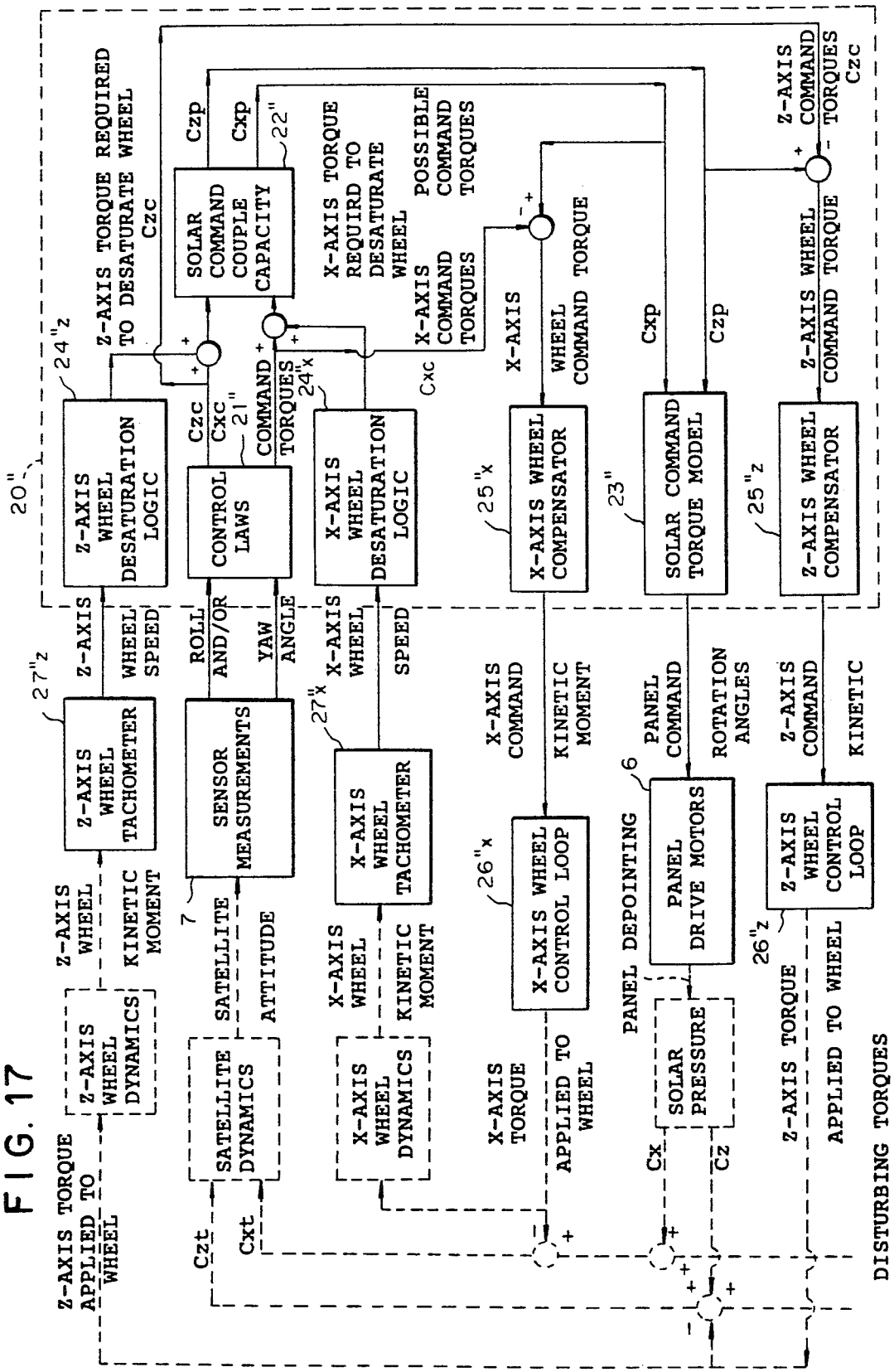

FIG. 17 summarises the attitude control logic in the case of a kinetic moment orientable about two (or more) axes or in the case of a kinetic moment with any orientation.

The attitude measured by the satellite sensors is processed by a controller which determines the torques to be applied in the roll-yaw plane to control the attitude of the satellite. In this example use may be made of a "PID" (Proportional Integral Differential) type law as described in ATTITUDE CONTROL OF THE INFRARED SPACE OBSERVATORY AND ITS PREDECESSOR—R. J. HAMANN—AAS 84-004). To the command torque about the X and Z axes is added the torque needed to reduce the roll-yaw component of the kinetic moment to zero.

The command torque in the roll-yaw plane and the torque capacity shown in FIG. 4 are converted into a system of axes (x, z) in which z is the axis of the roll-yaw component of the kinetic moment which is nearer saturation. Any error in the torque about the x axis can be compensated by variation of the roll-yaw component of the kinetic moment about the x axis.

Two situations can arise:
if it is possible to apply the command torque about the x axis the solar torques will enable satellite attitude control and approximation of the kinetic moment component in the roll-yaw plane to its nominal value,
if it is not possible to apply the command torque about the x axis, the computer determines the possible value nearest the command value; in this case the discrepancy is compensated using reaction wheels.

Figure 18:
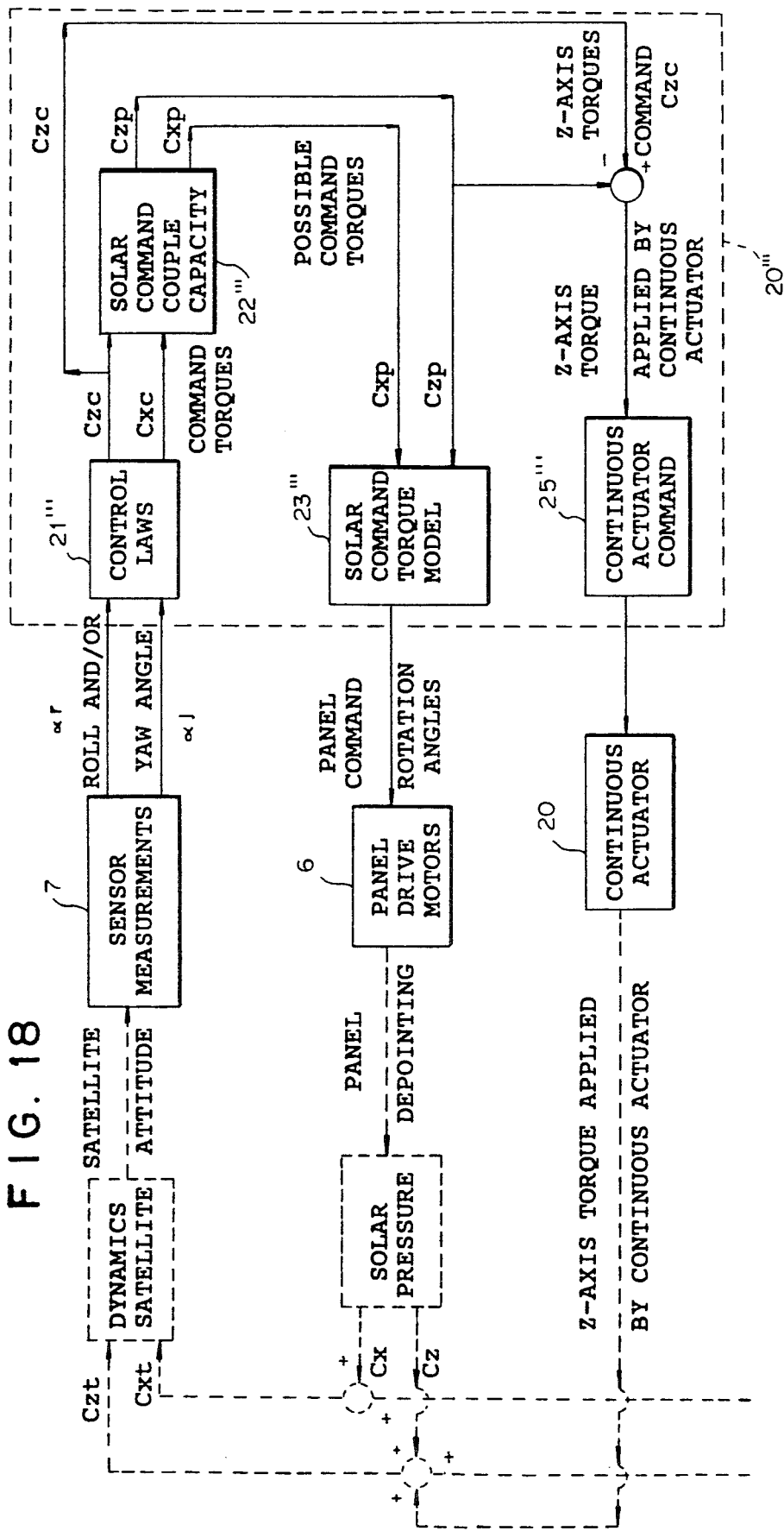

FIG. 18 shows the control logic in the case of a continuous actuator. It is similar to FIG. 16 except that the command torque discrepancy is compensated by the continuous actuator(s).

The difference between the command solar torques and the torques actually obtained is inversely proportional to the authorised depointing of the panels. It is therefore necessary to arrive at a compromise between the maximum value of the kinetic moment and the loss of electrical power from the solar generator due to the depointing of the panels.

The invention makes it possible to use the solar radiation pressure on the panels of the photovoltaic generator of a satellite stabilised with respect to its three axes and advantageously provided with at least one kinetic moment about an axis in the roll-yaw plane or the plane of the orbit to create torques in the roll-yaw plane for balancing disturbing torques operating on the satellite, to control its attitude, to desaturate any reaction wheels with which the satellite is provided, and to desaturate the component in the roll-yaw plane of the kinetic moment if the satellite has an orientable kinetic moment, each panel being oriented by its drive motor.

For a EUTELSAT 2 type satellite chosen as an example of a satellite that could be equipped with the present invention, and for the V configuration kinetic wheels, the accuracy of control about the roll (X) axis is 0.01 degree and the accuracy of control about the yaw (Z axis) is 0.25 degree:
for a loss of solar generator power on the panel with the larger depointing angle of:
0.25% maximum,
0.2% average,
in the presence of disturbing torques in the order of:
$5 \times 10^{-6}$ Nm in the satellite frame of reference,
$6.5 \times 10^{-6}$ Nm in the solar (inertial) frame of reference,
$1.5 \times 10^{-6}$ Nm relative to the second harmonic of the orbital period;
without any mass penalty.

On EUTELSAT 2, roll-yaw attitude control will consume approximately 9 kg of propellant during the seven-year life of the satellite. These 9 kg could be saved by application of the present invention. The loss of electrical power from the solar generator is negligible in comparison with the electrical power margins needed to allow for deterioration of the solar generator and for seasonal variations in exposure to solar radiation (solstices and eclipses during equinoxes).

The method as described is a discrete method with an increment which is advantageously in the order of 100 s, although if required this could be reduced to as little as 0.5 s or increased to more than 1,000 s.

It goes without saying that the foregoing description has been given by way of non-limiting example only and that numerous variations may be put forward by those skilled in the art without departing from the scope of the invention.

It will be understood that if the satellite carries reaction wheels they may be accelerated and then desaturated twice a day.

Note that the presence of an orientable kinetic moment generator on the satellite is tending to become standard practice with a view to increasing versatility, for example to enable modification of the latitude of the observation area of a geostationary satellite, or to enable damping of nutation after each thruster firing when thrusters are used for attitude control. The invention therefore makes it possible to increase the life of the satellite by abandoning attitude correction using thrusters in favour of the at least partial availability of the kinetic moment generator normally intended for nutation compensation or for any other function.

On a very general level, note that the invention preferably proposes the use of actuators provided on the satellite to compensate for differences between the theoretical command and practically achievable torques about the x (and possibly z) axis.

In addition to wheels (or rotating masses, see above), these actuators could be:
of the magnetic type,
of the material ejector type,
of the type in which kinetic moment is exchanged between various parts of the satellite mobile relative to each other,
of the type in which motion is exchanged between various parts of the satellite mobile relative to each other,
of the aerodynamic type,
of the type using the gravity gradient.

I claim:
1. A method for controlling the roll and yaw attitude of an artificial satellite following an orbit in the solar system and provided with roll, yaw and pitch axes, where the satellite has a satellite body with North and

South sides, North and South solar generator panels extending from said North and South sides and connected to said satellite body by respective independent drive motors adapted to be controlled separately so as to orient said North and South solar generator panels about said pitch axis with respective depointing angles $\gamma_n$ and $\gamma_s$ relative to respective nominal instantaneous orientations in which said panels face towards the sun, an attitude measuring system adapted to provide instantaneous roll and yaw attitude signals; and calculation means at least partly carried on board the satellite being provided for calculating from said attitude signals theoretical command torques to be generated in the plane of the roll and yaw axes for cancelling any instantaneous attitude error of the satellite in said plane of the roll and yaw axes; this method comprising the steps of:

A. as a preliminary stage:

selecting respective acceptable ranges for said respective depointing angles of said North and South solar generator panels;

determining for any pair of respective depointing angles within said respective acceptable ranges a respective pair of resulting command torques $C_s$–$C_p$ parallel to two predetermined torque axes in said plane of said roll and yaw axes induced by the solar radiation pressure acting on said solar generator panels;

reporting in a $C_s$–$C_p$ diagram points having as coordinates said respective pairs of resulting command torques and determining in said diagram a locus consisting of the whole of said points, any pair of coordinates in this diagram thus determining either a possible command torque if said coordinates define a point inside said locus, or a non-possible command torque if said coordinates define a point outside said locus;

and, drafting a law of correlation between each point of said locus and a corresponding pair of depointing angles able to induce due to solar radiation pressure the possible command torque determined by said each point;

B. then cyclically at a specific frequency that is constant or not as the satellite follows its orbit:

selecting the geometrical axes x and z, fixed or not, in said plane of the roll and yaw axes and selecting for said geometrical axes respective maximum values of tolerable command torque error such that the maximum value for the z axis is substantially lower than the maximum value for the x axis;

tracing these geometrical axes in said $C_s$–$C_p$ diagram;

calculating from instantaneous roll and yaw attitude signals supplied by said attitude measuring system, a respective instantaneous theoretical command torque in said plane of the roll and yaw axes adapted to cancel any instantaneous attitude error;

identifying in said locus a point, having relative to said z geometrical axis a torque component substantially identical to the torque component of the point corresponding to said respective instantaneous theoretical command torque and having relative to the x axis a torque component as near as possible to the torque component of said point corresponding to said respective instantaneous theoretical command torque;

identifying with said law of correlation from said point in said locus a respective pair of depointing angles;

and, controlling said drive motors so as to orient said solar generator panels to said pair of depointing values.

2. The method of claim 1, wherein said predetermined torque axes are respectively parallel and perpendicular to the projection in said plane of the roll and yaw axis of the solar rays.

3. The method according to claim 1, wherein said satellite includes actuators which are commanded to generate compensation torques defined as the difference between the theoretical command torque about at least the x axis and the possible command torque chosen for the correlation.

4. The method according to claim 1, wherein said satellite comprises a system for generating a kinetic moment with fixed components in the plane of the roll and yaw axes and the x and z axes are respectively coincident with the roll and yaw axes.

5. The method according to claim 1, wherein said system for generating a kinetic moment comprises a kinetic wheel with its axis parallel to the North-South pitch axis.

6. The method according to claim 1, wherein said satellite comprises a system for generating an orientable kinetic moment possibly with a null value, with a component variable with respect to at least one axis in the plane of the roll and yaw axes, the x axis is coincident with said axis, and, if the theoretical and possible command torques are different, there is applied to said kinetic moment generator system a command signal adapted to vary said variable component in such a way as to generate an additional torque equal to the difference between the theoretical and possible command torques, if the theoretical and possible command torques are equal, there is calculated the value of a desaturation torque adapted to vary said variable component of the kinetic moment until it equals a predetermined nominal value, a global theoretical command torque is calculated equal to the sum of the theoretical command torque and the desaturation torque, a second possible command torque is selected on said locus of possible torques having a component about the z axis substantially equal to that of the theoretical command torque and a component about the x axis as close as possible to that of the global theoretical command torque, the correlation law is used to deduce therefrom a second pair of possible values of depointing angles, said solar generator panels are controlled so as to reach these depointing angles, and the kinetic moment generator system is controlled so as to generate a variation of said variable components adapted to generate a compensation torque equal but opposite to the difference between the second possible command torque and the theoretical command torque.

7. The method according to claim 6, wherein said kinetic moment generator system comprises a reaction wheel either aligned on the axis of the variable component or whose axis is contained in the plane defined by the pitch axis and the axis of said variable component.

8. The method according to claim 7, wherein said system further comprises a kinetic wheel substantially on the pitch axis.

9. The method according to claim 7, wherein said reaction wheel is on the yaw axis, the x axis is parallel to said yaw axis and the z axis is parallel to the roll axis.

10. The method according to claim 6, wherein said kinetic moment generator system is adapted to generate a kinetic moment with a plurality of variable components on different axes in the plane of the pitch and yaw axes and the x and z axes are defined at all times so as to minimize the difference between said variable components and a respective associated predetermined value.

11. The method according to claim 10, wherein said kinetic moment generator system comprises a plurality of reaction wheels whose axes are respectively in the planes defined by the pitch axis said axes of said variable components.

12. The method according to claim 10, wherein said kinetic moment generator system comprises a wheel whose rotation axis has a plurality of degrees of freedom in rotation with axes perpendicular to said axes of said variable components.

13. The method according to claim 12, wherein the axis of the wheel is nominally on the satellite pitch axis.

14. The method according to claim 12, wherein said wheel has two degrees of freedom about the satellite roll and yaw axes.

15. The method according to claim 6, wherein said kinetic moment generator system is adapted to generate a kinetic moment with two variable components about different axes in the plane of the roll and yaw axes, the x and z axes being selected coincident with said two variable component axes so that the z axis is at all times coincident with that of the two axes corresponding to that one of the two variable components which is further from a predetermined nominal value associated with said axis.

16. The method according to claim 10, wherein said kinetic moment generator system comprises two reaction wheels respectively on the roll and yaw axes.

17. The method according to claim 16, wherein said system further comprises a reaction wheel or a kinetic wheel substantially on the pitch axis.

18. The method according to claim 6, wherein the kinetic moment generator system comprises two kinetic wheels disposed in a V arrangement with their axes in the plane defined by the pitch axis and the variable component axis and in a substantially symmetrical relationship thereto on the opposite side of the pitch axes respectively.

19. The method according to claim 18, wherein the variable component axis is on the yaw axis, the x axis is parallel to said yaw axis and the z axis is parallel to the roll axis.

20. The method according to claim 6, wherein the kinetic moment generator system comprises a kinetic wheel whose axis has one degree of freedom in rotation with an axis perpendicular to the variable component axis.

21. The method according to claim 20, wherein the axis of the wheel is nominally on the satellite pitch axis.

22. The method according to claim 20, wherein the variable component axis is on the yaw axis, the x axis is parallel to the yaw axis, the z axis is parallel to the roll axis and said axis perpendicular to the variable component axis is on the roll axis.

23. The method according to claim 1, wherein the cycle period is between 0.5 second and 1000 seconds approximately.

24. The method according to claim 10, wherein said kinetic moment generator system is adapted to generate a kinetic moment with two variable components about different axes in the plane of the roll and yaw axes, the x and z axes being selected coincident with said two variable component axes so that the z axis is at all times coincident with that of the two axes corresponding to that one of the two variable components which is further from a predetermined nominal value associated with said axis.

* * * * *